(12) United States Patent
Colafrancesco et al.

(10) Patent No.: US 11,002,820 B2
(45) Date of Patent: May 11, 2021

(54) SYSTEM FOR OBJECT TRACKING IN PHYSICAL SPACE WITH ALIGNED REFERENCE FRAMES

(71) Applicant: 7hugs Labs SAS, Montrouge (FR)

(72) Inventors: Julien Colafrancesco, Paris (FR); Simon Tchedikian, Issy-les-Moulineaux (FR); Nicolas Schodet, Antony (FR); Simon Guillot, Nantes (FR)

(73) Assignee: 7hugs Labs SAS, Montrouge (FR)

( * ) Notice: Subject to any disclaimer, the term of this patent is extended or adjusted under 35 U.S.C. 154(b) by 302 days.

(21) Appl. No.: 16/049,074

(22) Filed: Jul. 30, 2018

(65) Prior Publication Data

US 2020/0033437 A1  Jan. 30, 2020

(51) Int. Cl.
*G01S 5/00* (2006.01)
(52) U.S. Cl.
CPC ........................ *G01S 5/00* (2013.01)
(58) Field of Classification Search
CPC ........................................................ G01S 5/00
USPC ........................................................ 702/150
See application file for complete search history.

(56) References Cited

U.S. PATENT DOCUMENTS

| 6,662,103 | B1 * | 12/2003 | Skolnick | G01S 1/54 |
| | | | | 701/520 |
| 7,451,549 | B1 | 11/2008 | Sodhi | |
| 7,643,939 | B2 | 1/2010 | Zeng | |
| 8,005,635 | B2 | 8/2011 | Lin | |
| 8,825,426 | B2 | 9/2014 | Chowdhary | |
| 9,229,084 | B2 | 1/2016 | Tu | |
| 9,849,376 | B2 | 12/2017 | Wilson | |
| 9,885,574 | B2 | 2/2018 | Moore | |
| 2005/0094610 | A1 | 5/2005 | De Clerq | |
| 2012/0212374 | A1 | 8/2012 | Kirby et al. | |

(Continued)

FOREIGN PATENT DOCUMENTS

WO     2017089202 A1    6/2017

OTHER PUBLICATIONS

International Search Report and Written Opinion dated Dec. 16, 2019 from International Application No. PCT/IB2019/056460 filed Jul. 30, 2019, 11 pages.

(Continued)

*Primary Examiner* — Ricky Ngon
(74) *Attorney, Agent, or Firm* — Withrow & Terranova, P.L.L.C.

(57) ABSTRACT

Methods and systems associated with aligning reference frames used for tracking an object are disclosed. One embodiment disclosed herein is a method for generating a transform between a first and second frame of reference (FOR) using a sequence of heading values of the object in the first and second FOR. The method comprises providing instructions to orient the object towards one or more external positioning devices in an orienting sequence. The method also comprises obtaining the sequence of heading values of the object in the second FOR using an onboard sensor and obtaining a sequence of position values of the object in the first FOR in accordance with the orienting sequence and using the one or more external positioning devices. The method also comprises deriving the sequence of heading values of the object in the first FOR using the sequence of position values.

32 Claims, 5 Drawing Sheets

(56) References Cited

U.S. PATENT DOCUMENTS

| | | | |
|---|---|---|---|
| 2013/0046505 A1* | 2/2013 | Brunner | G01C 22/006 |
| | | | 702/141 |
| 2014/0180627 A1* | 6/2014 | Naguib | G01C 21/08 |
| | | | 702/150 |
| 2014/0365154 A1 | 12/2014 | Moore | |
| 2015/0247729 A1* | 9/2015 | Meduna | G01C 21/165 |
| | | | 702/150 |
| 2016/0313126 A1* | 10/2016 | Lemarchand | G01P 13/00 |
| 2018/0059212 A1 | 3/2018 | Avitan et al. | |
| 2018/0115876 A1 | 4/2018 | Maricic et al. | |

OTHER PUBLICATIONS

First Examination Report dated Feb. 15, 2021 from Australian Application No. 2019315032, 4 pages.
International Preliminary Report on Patentability dated Feb. 11, 2021 from International Application No. PCT/IB2019/056460, 8 pages.
Notice of Acceptance for Australian Patent Application No. 2019315032, dated Feb. 26, 2021, 3 pages.
Office Action for Canadian Patent Application No. 3,107,907, dated Feb. 25, 2021, 4 pages.

* cited by examiner

SYSTEM FOR OBJECT TRACKING IN PHYSICAL SPACE WITH ALIGNED REFERENCE FRAMES

BACKGROUND

A "frame of reference" or "reference frame" is a standard relative to which motion and rest may be measured. Any set of points in physical space that are at rest with respect to each other can provide a spatial reference frame for measuring the relative motion of objects in that physical space. For purposes of this disclosure, an inertial reference frame can be defined as $F_{in}=(o_{in}; x_{in}; y_{in}; z_{in})$. In this definition, $o_{in}$ is a vector describing the location of the origin of the inertial reference frame, and $x_{in}$, $y_{in}$, and $z_{in}$ are vectors describing the orientation of the three axes of the inertial reference frame. Throughout this disclosure, vectors and matrices are respectively represented by bold lowercase and uppercase characters. For purposes of this disclosure, a navigation frame can be defined as a reference frame centered on an object in motion such that the origin changes with time. A particular navigation frame can thus be defined as $F_{nav}=(p_b(t); x_{nav}; y_{nav}; z_{nav})$. In this definition, $p_b(t)$ is a function which provides a vector describing the location of the object in space and serves as the origin of the navigation frame, and $x_{nav}$, $y_{nav}$ and $z_{nav}$, are vectors describing the orientation of the axes of the navigation reference frame. Finally, a body frame of reference is a frame centered on an object, and whose axes are fixed relatively to the orientation of this object. This can be noted $F_b=(p_b(t); Q_b(t)e_1; Q_b(t)e_2; Q_b(t)e_3)$ with $e_i$ a three dimensional vector with a 1 on its ith element and 0 everywhere else, and $Q_b(t)$ a rotation matrix representing the body's orientation with time. By convention in this document, $e_1$ will be chosen as the body's heading axis in the body frame of reference.

The definitions provided above assume that there is a unifying coordinate system under which each frame can be defined, where the vectors in the definition of each frame of reference are values in this unifying coordinate system. However, the unifying coordinate system can be unknown from a system designer's perspective. Although this may be counterintuitive from the perspective of everyday life, in which the Earth provides an overarching frame of reference for everyone and everything, an automated system does not intuitively know what down and North are. Furthermore, even if each component of a system was given a gravity sensor and compass, variations in the sensors provided to each element of the system result in the system still not having a common frame of reference for creating a unified model of a physical space. As a result, transforms are sometimes utilized to align the reference frames used by a given system.

Transforms are used to align reference frames for assorted reasons. One reason is to take data obtained in one frame and represent it in another frame that is more conducive to the operations that the system is designed to conduct. For example, some GPS systems first estimate the position and velocity of a satellite in an inertial orbital frame and then translate the data to an Earth-fixed reference frame so that it will make sense to a user who is using the data to navigate with respect to the Earth's surface. Another reason for utilizing a transform is to align data obtained from different frames of reference into a single accurate model. However, aligning reference frames is not always necessary. For example, a map application on a smartphone will sometimes allow a user to track the location of the smartphone on the map and present both an orientation and a position of the phone to a user. The orientation and position will be presented to the user in a merged format in the form of an arrow pointing in a given direction and located at a given position on the map. The orientation may be provided by an onboard sensor on the smartphone while the position is determined by external devices such as satellites or wireless base stations. However, there is no need to align the reference frames used by the external devices and the onboard sensor because the level of accuracy required for a map application does not necessitate that both sources of data be aligned.

SUMMARY

Systems and methods that track both the orientation and physical position of the object are disclosed. The system can involve multiple sensors taking measurements in different reference frames. The disclosed systems and methods allow the object to be tracked with high accuracy by the multiple sensors by aligning the reference frames of those sensors. The multiple sensors can be tasked with measuring distinct aspects of the object. In specific embodiments, the position of the device can be measured by sensors in the form of one or more external positioning devices while the orientation of the device is measured by an onboard sensor. The one or more external positioning devices can measure the position of the object in a first frame of reference while the onboard sensor measures the orientation of the object in a second frame of reference. In general, the first and second frames may not be inherently aligned (i.e., the vectors composing the basis of each frame are not collinear two by two). Additionally, there may be incertitude concerning the handedness of those frames. The methods and systems disclosed herein allow for the generation of a transform between different frames of reference to allow data from multiple sensors to be combined into a unified whole. In the example of a set of external sensors tracking position and an onboard sensor tacking orientation, the transform can subsequently be used to accurately track the position and orientation of the object in a single reference frame. The position of the object can be obtained in the first frame of reference, the orientation of the object can be obtained in the second frame of reference, and the transform can be used to stitch together the two sets of measurements to provide a complete model of the object in a physical space.

In specific embodiments disclosed herein, the position of the object is measured by one or more external positioning devices in a first frame of reference, and the location of each device in the one or more external positioning devices is also known in the first frame of reference using a measurement procedure conducted by the external positioning devices. The one or more external positioning devices can use wireless signals to identify the position of objects in the system in a single frame of reference defined by that measurement procedure. The one or more external positioning devices can include wireless transceivers to emit and measure wireless signals and conduct a time of flight (TOF) analysis on the signals. The signals can be directed to a tag or transceiver located on the object or on other external positioning devices in the system. The position of the object and other external positioning devices can then be determined by measuring the TOF from emission to reception of the signals directed to the object by knowing the signal's speed in the considered medium. In specific approaches, the position of the object can then be inferred in the first frame of reference using methods such as multilateration (MLAT).

In specific embodiments disclosed herein, the object is sequentially oriented in a physical space according to an orienting sequence while the position and orientation of the object are obtained in two frames of reference. The orienting sequence can be provided to a user who is thereby instructed to physically orient the object in accordance therewith. At each point in the orienting sequence, one or more external positioning devices can obtain the position of the object in the first frame of reference while the onboard sensor obtains the orientation of the object in the second frame of reference. The system can then derive a heading of the object in the first and second frames of reference from the obtained values. The heading value in the second frame of reference can be derived from the orientation measurement taken in the second frame of reference because heading is a single component of orientation. Additionally, the heading value in the first frame of reference can also be derived because the user is orienting the object towards a location that is known in the first frame of reference. The orienting sequence therefore indirectly provides the system taking measurements in the first frame of reference with information concerning how the device is oriented. The corresponding heading values from each frame of reference, obtained while the object is sequentially oriented in accordance with the orienting sequence, can then be used to generate a transform between the two frames of reference.

In one specific embodiment, a process is provided. The process comprises providing instructions to orient an object towards one or more external positioning devices in an orienting sequence. The process also comprises obtaining, in accordance with the orienting sequence and using the onboard sensor, a sequence of heading values of the object in a second frame of reference. The process also comprises obtaining, in accordance with the orienting sequence and using the one or more external positioning devices, a sequence of position values of the object in a first frame of reference. The process also comprises deriving, using the sequence of position values of the object in the first frame of reference, a sequence of heading values of the object in the first frame of reference. The process also comprises generating a transform between the first and second frames of reference using the sequence of heading values of the object in the first frame of reference and the sequence of heading values in the second frame of reference.

In another specific embodiment, a system is provided. The system comprises an object, and onboard sensor on the object, and one or more external positioning devices. The one or more external positioning devices are configured to provide instructions to orient the object towards the one or more external positioning devices in an orienting sequence. The system also comprises one or more computer readable media storing instructions to: obtain, in accordance with the orienting sequence and using the one or more external positioning devices, a sequence of position values of the object in a first frame of reference; obtain, in accordance with the orienting sequence and using the onboard sensor, a sequence of a-heading values of the object in a second frame of reference; derive, using the sequence of position values of the object in the first frame of reference, a sequence of heading values of the object in the first frame of reference; and generate a transform between the first and second frames of reference using the sequence of heading values of the object in the first frame of reference and the sequence of heading values in the second frame of reference.

In another specific embodiments, a process is provided. The process comprises obtaining, while the object is physically oriented towards a first positioning device: a first position of an object in a first frame of reference using the first positioning device and a second positioning device; and a first heading of the object in a second frame of reference using a sensor on the object. The process also comprises obtaining, while the object is physically oriented towards the second positioning device a second position of the object in the first frame of reference using the first positioning device and the second positioning device; and a second heading of the object in the second frame of reference using the sensor on the object. The process also comprises deriving: (i) a third heading in the first frame of reference using the first position of the object in the first frame of reference; and (ii) a fourth heading in the first frame of reference using the second position of the object in the first frame of reference. The process also comprises generating a transform from the first frame of reference to the second frame of reference using the first, second, third, and fourth heading.

DETAILED DESCRIPTION

Systems and methods used for accurately tracking an object in physical space are disclosed in detail herein below. The system can involve multiple sensors or sets of sensors which take measurements in different frames of reference and a transform between those frames of reference. Measurements taken in the different frames of reference can subsequently be used to track the object by using the transform and the measurements themselves. The specific embodiments of these systems and methods disclosed in this section are provided for explanatory purposes and are not meant to limit the invention, the scope of which is provided by the appended claims. A set of these specific embodiments can be described with reference to FIG. 1.

Figure 1:
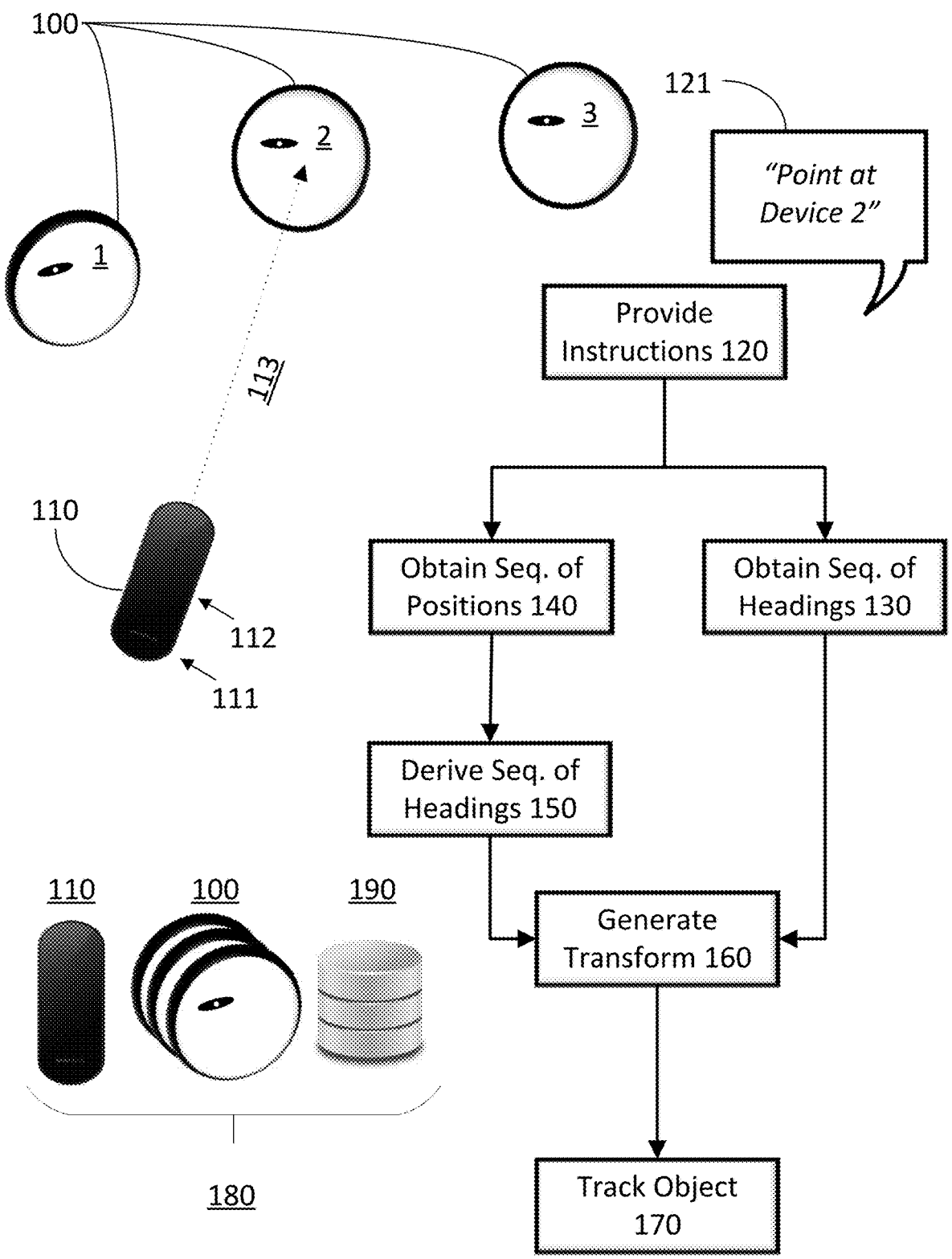
FIG. 1 illustrates a system and a flow chart for a set of methods of aligning two reference frames to track an object in physical space that are in accordance with specific embodiments disclosed herein.

Specific embodiments involve a first sensor or set of sensors that measure the position of the object; and a second sensor or set of sensors that measure the orientation of the object. FIG. 1 provides the example of a set of external positioning devices 100 that measure the position of an object 110 while an onboard sensor 111 located within a casing of object 110 measures the orientation of the object. The first sensor or set of sensors and the second sensor or set of sensors can obtain measurements in different frames of reference. The different frames of reference may not be parallel. In the example of FIG. 1, the frame of reference for object 110 may be provided by a measurement of the Earth's gravity by an onboard gravity sensor and a measurement of magnetic north by a magnetometer. The frame of reference for external positioning devices 100 may be defined arbitrarily by agreement between the devices and not have any relationship to the frame of reference for object 110. Alternatively, the sensors can be equipped with sensors similar to those on object 110 to provide the external positioning devices 100 with a frame of reference based on the Earth. However, even in this situation the frames may not be sufficiently parallel due to discrepancies between the sensors used by each set of sensors. Systems in accordance with this disclosure can be designed to generate a transform between two frames of reference so that measurements taken by the first sensor or set of sensors and the measurements taken by the second sensor or set of sensors can be combined to acutely track an object.

The object being tacked can be any object whose position needs to be determined by an automated system with a high degree of accuracy. The object can be a pointing device such as a remote control, presentation pointer, inventory management device, or a toy used for wireless tag. The pointing device will have a defined pointing direction which is associated with a heading the user aligns a target with when pointing. In other embodiments, the object can be a drone, smart phone, tablet computer, wearable computing device, or any other computing device. In the specific example of FIG. 1, object 110 is a dedicated device that operates as a universal controller. The controller can operate to control one or more electronic devices and may transmit signals to these devices using any form of wireless transmitter. The tracking system can be used to determine which device the controller is pointing towards at any given time.

A set of external positioning devices for tracking the position of an object in accordance with this disclosure can take on various forms. The set of external positioning devices can include two or more substantially homogenous elements that measure the position of the object in physical space. The set of external positioning devices can measure the position of the object using wireless signals. For example, and as mentioned in the summary, the external positioning devices can direct wireless signals towards a tag or transceiver on the object and conduct a TOF analysis on those signals and obtain a measurement of the object's position using MLAT. The external positioning devices can alternatively observe the object using visible light and obtain a measurement of the object's position using computer vision image processing techniques. The external positioning devices can alternatively observe the object using a projected light field and obtain a measurement of the object's position using computer vision depth analysis techniques. The external positioning device can include a separate wireless transmitter for communicating encoded information with the other external positioning devices and the object such as via a Wi-Fi, Z-wave, or Zigbee protocol.

In the specific system illustration of FIG. 1, the set of external positioning devices 100 are a set of wall mounted anchors located in a room with object 110. In the illustrated case, the external positioning devices transmit wireless signals at a tag 112 on the device and obtain a measurement of its position using TOF and MLAT. Tag 112 can be an LPS receiver designed to interact with the set of external positioning devices 100. The set of external positioning devices 100 may be arranged in a space such that they are not co-linear. The set of external positioning devices 100 may function better if they have a line-of-sight to one another. Accordingly, set of external positioning devices 100 can be mounted high (e.g. at least 2 meters about the floor). The external positioning devices can be mounted to different walls of the space. Object 110 can also include a distance sensor and local positioning system (LPS) receiver for communicating with the set of external positioning devices 100 and determining the position of object 110. The LPS receiver may implement an ultra-wideband (UWB) local positioning system. The external positioning devices may communicate wirelessly with one another and with the object 110 to implement a UWB LPS system or any other LPS system known in the art.

An onboard sensor for tracking the orientation of an object in accordance with this disclosure can take on various forms. The onboard sensor can include one or more of a gravity sensor, accelerometer, magnetometer, gyroscope, or other sensor used to determine orientation, heading, or position. The accelerometer or accelerometers may implement a three-axis accelerometer measuring translational acceleration along three axes and may also measure rotation about the three axes. In specific approaches, the onboard sensor does not need to measure all three aspects of orientation and can instead only measure orientation to the extent necessary for deriving a heading of the object. For example, if the object were a pointing device, only azimuth and pitch angles may be required and measured while roll angle is ignored.

A method for tracking an object in accordance with this disclosure can include providing instructions to orient the object towards a set of external positioning devices in an orienting sequence. The orienting sequence can be provided to a user and can identify a specific order or points towards which an object should be oriented. Such a step is illustrated by step 120 in the flow chart of FIG. 1. The instructions can be provided all at once, or they can be provided in sequence along with additional steps in the flow chart of FIG. 1 as will be described below. The orienting sequence defines a specific ordering of the individual external positioning devices in the set of external positioning devices. The instructions can be provided in a form which indicates that the object should be oriented towards those individual external positioning devices in accordance with that ordering. The instructions can be provided in human-perceptible form such that a user can receive the instructions and act to position the object in accordance with that ordering.

In specific embodiments, the orienting sequence can be defined not by the position of the external positioning devices but by any set of points that are known in the frame of reference in which measurements by the external positioning devices are captured. The set of points can be known in the sense that digital values representing their positions are stored in a memory and is accessible to the external positioning devices, or the positioning system to which the external positioning devices are a part. The external positing devices are used as an example of a set of points known in this manner because many external positioning systems utilize a procedure in which the location of each device is a necessary input to determining the position of the tracked object. However, other points can be known to the positioning device such as external points that the set of external positioning devices have been calibrated to identify by a prior calibration procedure. In particular, in an indoor application, the external positioning devices could include environmental sensors such as visible light cameras that are able to detect the corners of a room they are located in using image processing techniques.

In the example of FIG. 1, the instructions are provided in part by symbols placed on an exterior surface of each external positioning device 100. In the illustrated case, the different symbols are taken from the set of simple Arabic numerals. The orienting sequence could then be "1, 2, 3" and the instructions would inform a user that they should point object 110 first towards external positioning device 1, then towards external positioning device 2, and then towards external positioning device 3. In the illustrated case, an auditory prompt 121 instructs a user to orient object 110 towards external positioning device "2". Similar auditory prompts could confirm that a given orientation was completed successfully and instruct the user to continue through the sequence. Multiple variations of the media and content of the instructions are provided in more detail below with reference to FIGS. 2-3.

At each orientation in the orienting sequence, measurements can be taken by both an onboard sensor and the external positioning devices. These sets of measurements will thereby form sequences of data values that correspond with the values of the orienting sequence. These sequences can be referred to as measurement sequences. The values of the sequences correspond in that the values in the measurement sequences were obtained while the object was oriented in accordance with the corresponding orientation in the orienting sequence. The sequences could have the same number of elements and a one-to-one value correspondence, or a separate mapping showing which orientation values from the orienting sequence correspond with which measurements in the measurement sequences. The two sequences of measurements may have been acquired with reference to different non-parallel reference frames.

In the example of FIG. 1, the two sequences of measurements mentioned above are obtained in: (i) a step 130 of obtaining a sequence of heading values for object 110 using an onboard sensor 111 located within a casing of object 110; and (ii) a step 140 of obtaining a sequence of position values for object 110 using the set of external positioning devices 100. The external positioning devices may make measurements in a first frame of reference such that the sequence of position values are in the first frame of reference. The onboard sensor may make measurements in a second frame of reference such that the sequence of heading values obtained in step 130 are in the second frame of reference. Each corresponding set of measurements in these sequences could be taken while object 110 is oriented towards a different point specified by the orienting sequence. For example, a set of measurements could be obtained while object 110 is oriented towards external positioning device 2 along heading 113 as illustrated. These values could be stored in memory for purposes of later deriving a transform between the two frames of reference.

The heading value in the second frame of reference can be obtained by various types of onboard sensors in numerous ways. The onboard sensor could be an inertial Motion Unit (IMU) mounted on or in the object. This object could include one or more of an accelerometer, a gyroscope and a magnetometer to serve as the onboard sensor. The heading value obtained in step 130 could be captured by the gyroscope, accelerometer, magnetometer or any combination of those devices. The onboard sensor could obtain an orientation vector and the heading value could be derived therefrom. A specific approach for conducting this action is described below with reference to FIG. 4.

In specific embodiments, a position value obtained by the external positioning devices in the first frame of reference while the object is oriented in a specific orientation could be used to derive a heading value for the object in the first frame of reference. Such a derivation could involve mathematical calculations and the manipulation of data by the system alone (i.e., without taking any other measurements). For example, the object could include more than one tag or transceiver that could be tracked by the external positioning devices, such as at either end of the object, and the heading of the object could be derived from those two positions based on an understanding of the design of the object and the relative observed position of the tags or transceivers. As another example, the relative position of the object and the point the object is oriented towards could be used to derive a straight-line distance between them which could be assumed to be the heading of the object given that the object is being oriented toward the point by virtue of a user following the provided instructions.

In the example of FIG. 1, the sequence of position values of the object in the first frame of reference obtained in step 140 can be used to derive a sequence of heading values of the object in the first frame of reference in a step 150. Using the illustrated example, the position value obtained while object 110 is oriented towards external positioning device 2 can be used to derive heading 113. A specific approach for conducting this action is described below with reference to FIG. 5. Accordingly, at this point in the flow chart, step 150 has generated a sequence of heading values in the first frame of reference, and step 130 has generated a sequence of corresponding heading values in the second frame of reference. The values in the sequences correspond in that, if the instructions provided via step 120 were followed, each pair of values was obtained while the object was oriented in the same manner. The measurements used to generate each corresponding pair of measurement values in steps 140 and 130 can be conducted simultaneously to assure that the object is in the same orientation during the execution of both measurements.

Once the system has obtained a set of corresponding heading values in both the first and second frames of reference, the system can use those values to derive a transform between the two frames of reference. Two pairs of corresponding values can be sufficient. However, the handedness of the transform may not be known without a third set of corresponding values. Additional sets can increase the accuracy of the transform and be used to solve for measurement errors, but they are not required. The transform can be expressed in the form of two matrices $R \in SO(3)$, the three-dimensional rotation group, and $M = \text{diag}(1\ 1\ \pm 1)$ such that $RM\ [x_2\ y_2\ z_2] = [x_1\ y_1\ z_1]$ where the subscripts distinguish the first and second frames of reference and the x, y, and z values are the axes of those frames.

FIG. 1 includes a step 160 of generating a transform between the first and second frames of reference using the sequence of heading values of the object in the first frame of reference derived in step 150 and the sequence of heading values in the second frame of reference obtained in step 130. FIG. 1 also includes a step 170 in which the transform is subsequently used to track the position and orientation of the device using position data from the set of external positioning devices 100, orientation data from the onboard sensor 111, and the transform generated in step 160.

The methods disclosed with reference to FIG. 1, and elsewhere throughout this specification, can be conducted at least in part by one or more processors executing instructions that are stored on one or more non-transitory computer-readable media. For example, steps 140-170 can be conducted by processors on the object 110, set of external positioning devices 100, or an optional server 190. Each element of the combined system 180, including the optional server, can be in communication via a wireless network which may include the Internet and numerous other intermediary devices. The instructions necessary to execute steps 140-170, and to provide instructions to guide a user through the orienting sequence such as in step 120, can involve executable instructions stored in various computer-readable media accessible to combined system 180. For example, instructions to execute step 130 may be entirely located in memory on object 110, while the instructions necessary to execute step 140 may be distributed amongst the set of external positioning devices. The instructions mentioned here refer to computer-readable instructions such as those written in computer code, and should not be confused with the instructions provided in step 120 which are human-perceptible instructions to physically alter the position of object 110.

The instructions to orient the object in a sequence of orientations according to an orienting sequence can be provided through various media and various combinations of media. The instructions can convey the orienting sequence to a user. The instructions can also include an indication as to the required duration during which each orientation should be held, a request for confirmation that the object is currently oriented in one of the orientations in the sequence, an identification of which point or external positioning device is associated with each orientation in the sequence, and a definition of what it means for the object to be oriented towards a point. However, certain aspects of the instructions mentioned above may not be explicitly provided as they may be inherently understood from context. For example, if the object is a pointing device, it is inherent that pointing the device towards the target serves to orient the object toward the target, and no explicit instructions defining what it means to orient the object towards a location are required.

Providing instructions to orient the object towards a set of external positioning devices according to an orienting sequence can include generating, in accordance with the orienting sequence, a set of human-perceptible signals. The human-perceptible signals can be auditory or visual signals. The system can be configured to provide instructions to orient the object towards the set point in the orienting sequence. For example, a speaker or display provided on the object, the external positioning devices, or another device could provide instructions such as "point the object towards the center of the ceiling" or "orient the object towards the smoke alarm." The other device could be a smartphone or other personal user device with installed software for conducting this procedure.

When the points are the external positioning devices, the set of external positioning devices can be configured to provide instructions to orient the object towards the set of external positioning devices. This can be done by generating a human-perceptible signal that distinguishes the external positioning device that should currently be the target. The human-perceptible signals can be generated electronically on the set of external positioning devices. For example, the set of external positioning devices can include lights or an integrated display to provide symbols in the form of a blinking light or information presented on a display. The information can include basic text presented on a display such as "point here now." As another example, the set of external positioning devices could include a speaker which would produce a chime or voice instruction to orient the object at the device generating the audible signal. The human-perceptible signal could also be displayed permanently on the external positioning device. For example, a serial number or symbol could be displayed on an exterior surface of the external positioning device to distinguish it from other devices in the set.

The instructions can both identify the points and the order of the points in the sequence. However, the identity of the points and the order of the points in the sequence can be provided via separate media. For example, although symbols presented on the external positioning device could inherently identify the order of the orienting sequence, such as in the case of consecutive Arabic numerals, they could simply be different symbols from a set of symbols such that the actual sequence needed to be provided via some other medium. In such cases, the object or another device in the system could be configured to provide instructions regarding the order of the orienting sequence. For example, the object or other external device could include a speaker instructing the user to orient the object at a positioning device displaying a specific symbol such as "point at the device with the red light now" or "point at the device 2 now." As another example, the object or other external device could include a display that would present a symbol matching one presented by the next device in the orienting sequence. For example, the object could present an image of a red circle on a display, and an external positioning device with a red circle imprinted on its exterior surface could be implicated by that image. This information could alternatively be provided by another external device.

In specific approaches, both the order and identity of the points in the sequence could be provided by the object. In these cases, a rough approximation of where the object was oriented, that did not rely on aligning reference frames, could be used to generate the instructions. For example, the object could include a display with an arrow guiding the user to orient the object in a given direction from which the user would ultimately be able to intuit which point is implicated by the orientation sequence and zero in on that point for the measurements to be taken.

In specific approaches, the points in the orienting sequence will be integrated into every day devices such as light bulbs, televisions, thermostats, etc. These devices could be under control of the system. These devices could include built in external positioning devices used to track the object. In these approaches, the main functionality or feature of the device could be used to provide instructions for the orienting sequence. For example, an external positioning device integrated with a light could indicate it was next in an orienting sequence by blinking, a thermostat could flash its display, a device with a speaker or bell could emit a chime, and nearly any electronic device could turn on and off. Essentially any functionality associated with the device could be repurposed to attract the attention of a user capable of orienting the object towards the device.

As mentioned with reference to FIG. 1, the provisioning of instructions can be conducted up front or throughout the execution of the orienting sequence by a user. In other words, the instructions can be provided step-by-step as the object is transferred between the different orientations in the sequence. The step of providing instructions for each step in the sequence can be gated by the receipt of some form of confirmation that the device has been oriented in accordance with a step in the sequence and/or that the measurements have been successfully obtained by the system. The acquisition of data from the external positioning devices and the onboard sensor at each orientation can be combined with this gating in that the collection of data can be a prerequisite to the confirmation being issued or can itself be triggered by the confirmation.

In specific embodiments, the object will include a user interface for receipt of a user-input confirming that the object is oriented in accordance with the current point in the orienting sequence. The user interface could be a microphone, for receiving a voice command input from a user, a touch screen, for receiving a touch command input from the user, a gesture recognition interface, or any other kind of user interface. Upon receipt of the user input, the object, or other portion of the system, could then produce a confirmation that the object was oriented as desired. In response to this confirmation, the sensors in the system could capture data associated with the current orientation and the system could subsequently issue the next instruction.

In specific embodiments, the confirmation can be generated automatically by the object. For example, the motion sensor could distinguish a sweeping movement from a constant position to indicate that the user first moved the object and then held the object stable in a specific direction. These approaches are beneficially applied where the object is already measuring its orientation using an accelerometer or IMU that can distinguish motion from a static phase. These approaches are particularly interesting where an IMU's intermittent static phases are generally not frequent in normal operation. However, if static phases are frequent, disambiguation can still be possible by setting a higher static duration threshold for generating the pointing confirmation.

Figure 2:
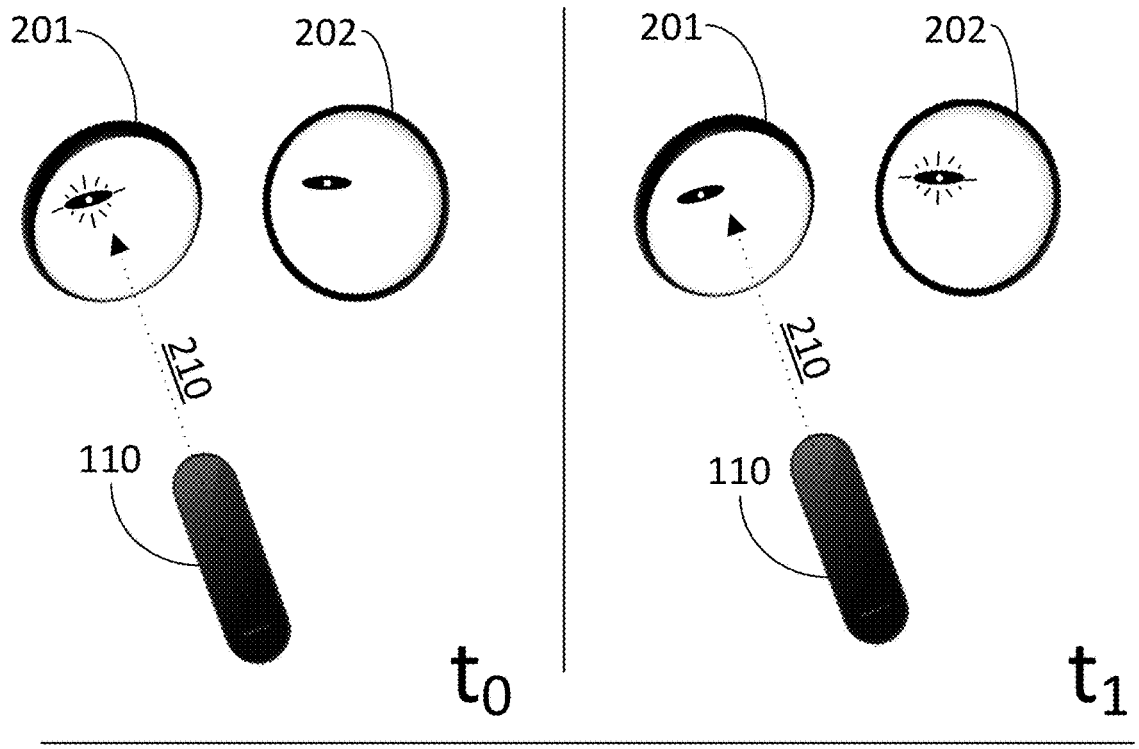
FIG. 2 illustrates a chronological procedure for a specific approach for providing instructions to a user, which include visible light signals, and obtaining the sequence of positions and sequence of orientations in accordance with specific embodiments disclosed with reference to FIG. 1.
Figure 2:
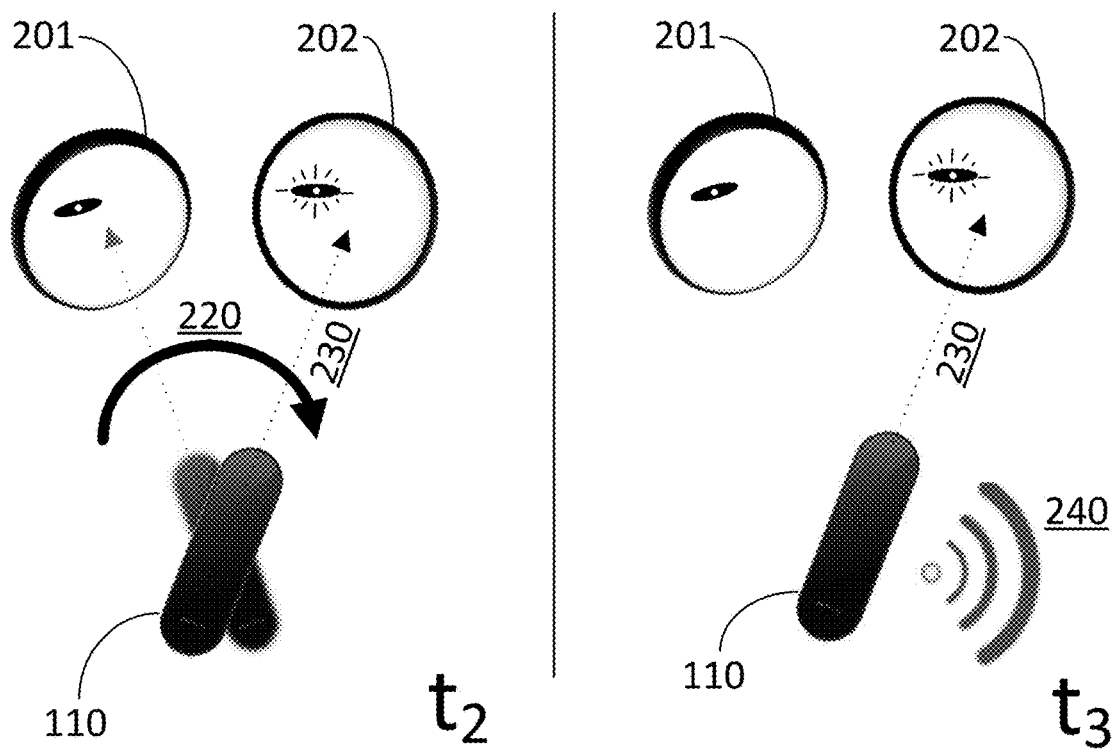
Figure 3:
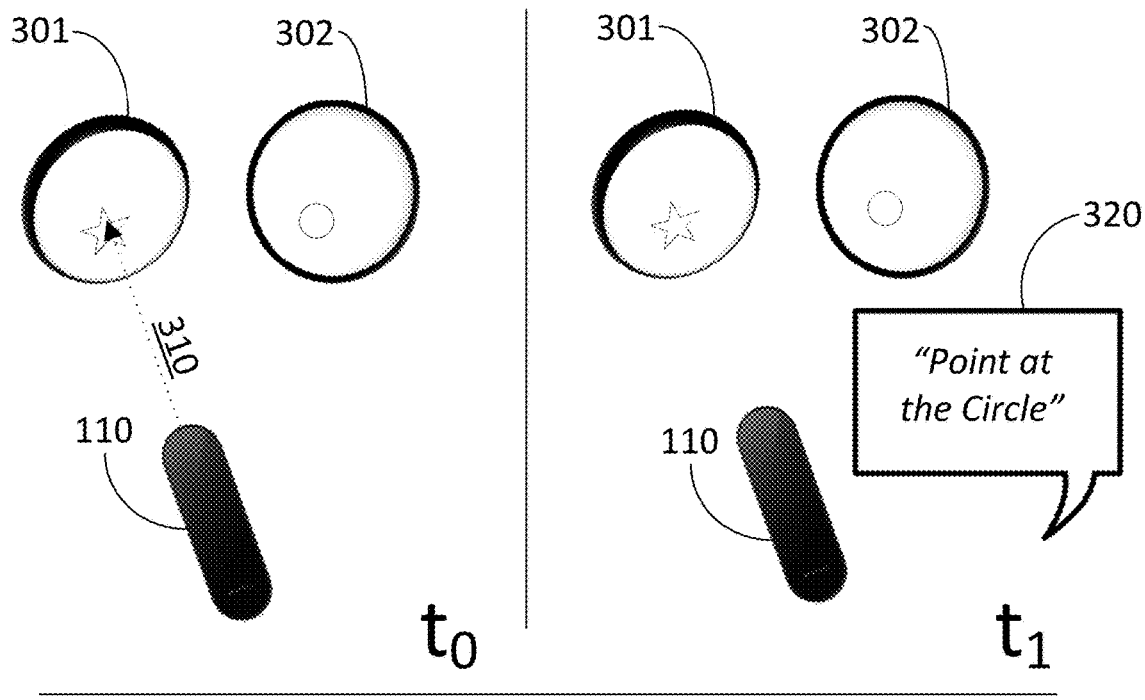
FIG. 3 illustrates another chronological procedure for a specific approach for providing instructions, which include permanent markings, to a user and obtaining the sequence of positions and sequence of orientations in accordance with specific embodiments disclosed with reference to FIG. 1.
Figure 3:
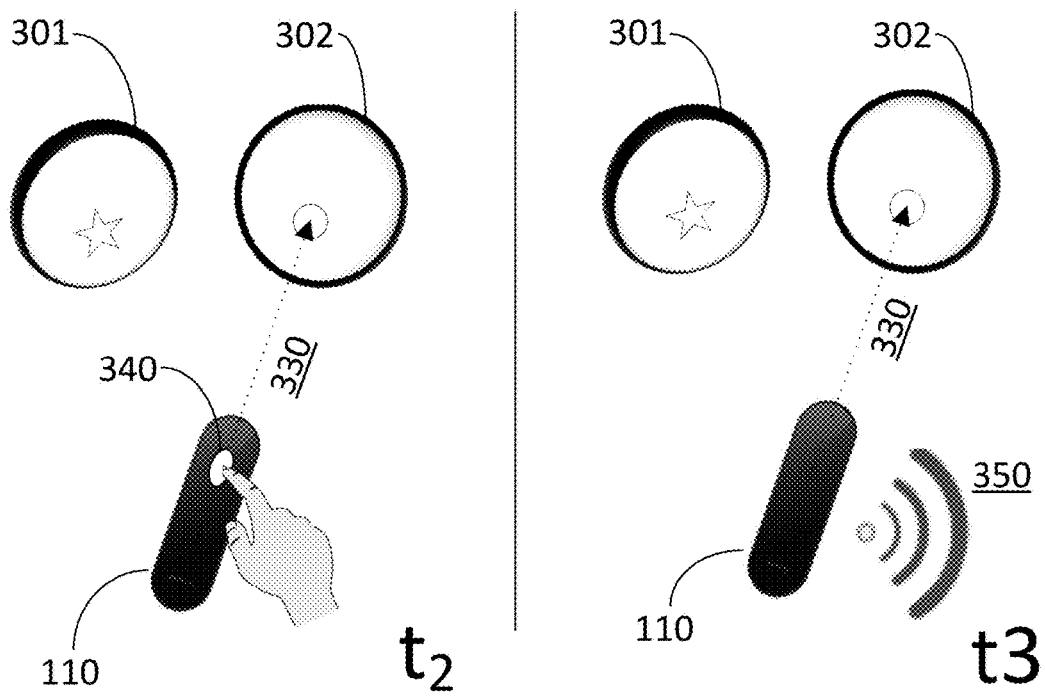

Numerous combinations of the procedures described above can be combined to gate the collection of measurements and provisioning of instructions via the receipt of a confirmation that the object has been placed in a specific orientation. FIGS. 2 and 3 chronologically illustrate two specific implementations that involve combinations of such approaches for explanatory purposes. Each diagram illustrates a specific system at four times t0, t1, t2, and t3 to show how receipt of a confirmation as to the orientation of the device can gate the collection of measurements and provisioning of instructions.

FIG. 2 illustrates two external positioning devices 201 and 202 each including an LED to indicate which external positioning device is defining the current orientation in the orienting sequence. At time t0, object 110 is oriented according to heading 210 and is directed at external positioning device 201. In the transition from time t0 to time t1 an additional instruction is provided to a user in the form of the LED on device 201 turning off, and the LED on device 202 turning on. In the transition to time t2, the user responds to the instruction by sweeping the object along a path 220 and brings the object to rest at heading 230. In this heading, the object is directed at external positioning device 202. In this manner, the user has been instructed as to the next step in the orientation sequence.

In the approach of FIG. 2, confirmations are generated on object 110 and are detected automatically by sensing when the object is being held in a fixed position. In the transition from time t2 to t3, object 110 will generate a confirmation that it has been oriented in accordance with the next orientation in the orienting sequence. In the illustrated case, object 110 includes instructions to detect a sweep through arch 220 and then determine that the object 110 is held at a fixed heading to automatically generate the confirmation. As such, at time t3, a measurement is taken both by object 110 and the external positioning devices 201 and 202 to ultimately obtain a heading value in both the first and second frames of reference associated with those sensors. As illustrated, the measurement generated by object 110, along with a confirmation that the measurement has been taken, can be wirelessly transmitted from object 110 in a broadcast 240. The external positioning devices may generate a similar confirmation to indicate that the position value for object 110 has been obtained. Both broadcasts can then be used to trigger the system to issue the next instruction and cycle back through another round of the illustrated states with heading 230 replacing heading 210 and device 202 replacing device 201.

FIG. 3 illustrates two external positioning devices 301 and 302 each including a unique symbol to distinguish one external positioning device from another. The symbols can be provided via a display on the exterior surface of the devices or be permanently marked on an exterior surface of the external positioning device. As illustrated, device 301 displays a star and device 302 displays a circle. At time t0, object 110 is oriented according to heading 310 directly at external positioning device 301. In the transition to time t1 an additional instruction is provided to a user in the form of an audible instruction 320. The audible instruction can be provided by a speaker on the object, a speaker on one or all of the external positioning devices, or a speaker on another device. In the transition to time t2, the user responds to the instruction by moving the object to align with heading 330 so that it is directly pointing at external positioning device 302.

In the approach of FIG. 3, confirmations are generated on object 110 in response to a user providing a touch input to a user interface. The user interface in the illustrated case is a button 340 presented on a touch screen on the object. In the transition to time t3, object 110 will generate a confirmation that it has been oriented in accordance with the next orientation in the orienting sequence. In the illustrated case, object 110 includes instructions to present button 340 and generate the confirmation when an input is received on that button. As such, at time t3, a measurement is taken both by object 110 and the external positioning devices 301 and 302 to ultimately obtain a heading value in both the first and second frames of reference associated with those sensors. As illustrated, the measurement generated by object 110, along with a confirmation that the measurement has been taken, can be wirelessly transmitted from object 110 in a broadcast 350. The external positioning devices may generate a similar confirmation to indicate that the position value for object 110 has been obtained. Both broadcasts can then be used to trigger the system to issue the next instruction and cycle back through another round of the illustrated states with heading 330 replacing heading 310 and device 302 replacing device 301.

After each confirmation, measurements from the sensors in the first and second frames of reference can be saved in a database. The database can be distributed throughout the system such as on the external positioning devices and on a memory located on the object. The database can also be localized such as on an external server or on the memory on the object. The measurements can then be used to derive the heading values in the first and second frame of reference. The derivation can likewise be conducted in a distributed fashion or at a single location. For example, all the data necessary to derive the headings can be sent to an external server, or the object can determine the headings in the second frame of reference and transmit them to an external server while the external positioning devices transmit the position values to that external server to derive the headings in the first frame of reference.

Figure 4:
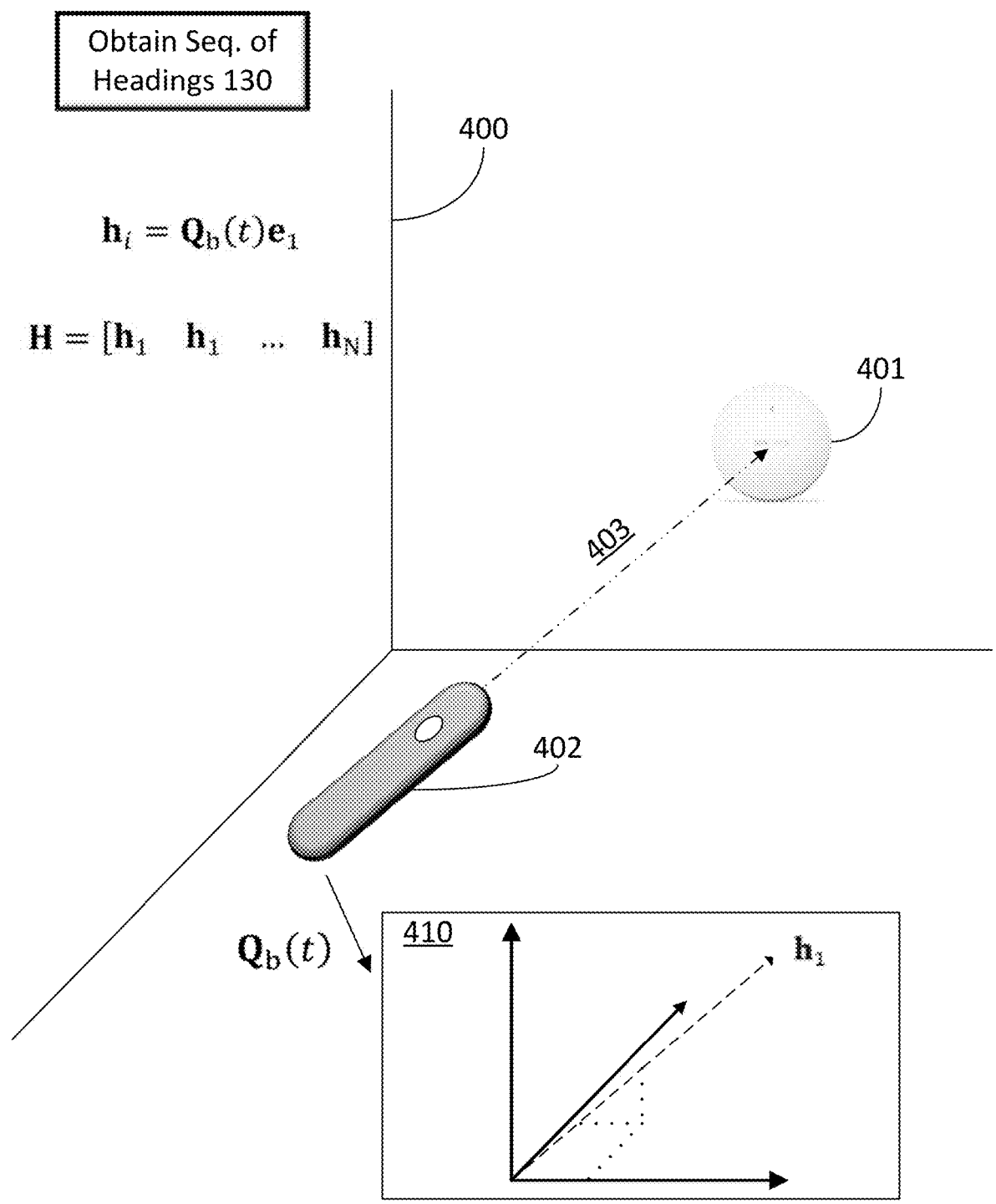
FIG. 4 illustrates a specific embodiment for obtaining a sequence of headings in a second frame of reference in accordance with specific embodiments disclosed with reference to FIG. 1.

FIG. 4 illustrates a specific approach that can be used in the execution of specific embodiments of step 130 in FIG. 1. FIG. 4 includes a physical frame of reference 400 that could be defined by the dimensions of a room in which object 402 is configured to operate. FIG. 4 shows how heading values for the object 402 can be measured and captured in a second frame of reference 410 defined by the onboard sensor on object 402. In embodiments in accordance with FIG. 4, obtaining each heading value in the sequence of heading values of the object in the second frame of reference as in step 130 comprises obtaining a physical orientation matrix $Q_b(t)$ for the object 402 using onboard sensors and computing the related heading direction. Since, in the illustrated case the object is a pointing device with heading defined in the body frame of reference by $e_1=[1\ 0\ 0]^T$, left multiplying this vector by $Q_b(t)$ gives the heading in the desired frame. Note that this operation simply corresponds to extracting the first column of $Q_b(t)$. Selection of that value for each orientation in the orientation sequence will therefore provide the corresponding heading $h_i$ for that orientation. Where i is an index defining the order of the corresponding orientation in the orientation sequence. A similar approach can be used any time the system has a preprogrammed understanding of the object being tracked such that the system can intuit the heading of the object from its physical orientation vector.

In the illustrated situation, object 402 is oriented towards a wall mounted beacon 401 which serves as an external positioning device. The device is oriented along heading 403. In accordance with specific embodiments of the disclosure, heading 403 will be captured in both the first frame of reference and the second frame of reference in order to generate the transform between the two reference frames. As illustrated, object 402 is a pointing device and includes an onboard sensor to track the orientation of the device over time $Q_b(t)$. The heading can therefore be obtained from the orientation via the calculation $h=Q_b(t)e_1$. This calculation essentially extracts the first column vector of the orientation matrix and can be carried out in a processor on device 402. The measurement of the orientation and derivation of the heading value can be repeated multiple times t0 develop a sequence of measurement values in the form of a matrix of headings $H=[h_1\ h_2\ \ldots\ h_N]$ where N is the number of orientations in the orienting sequence. These values can subsequently be used to generate a transform between the two frames of reference as described below.

Figure 5:
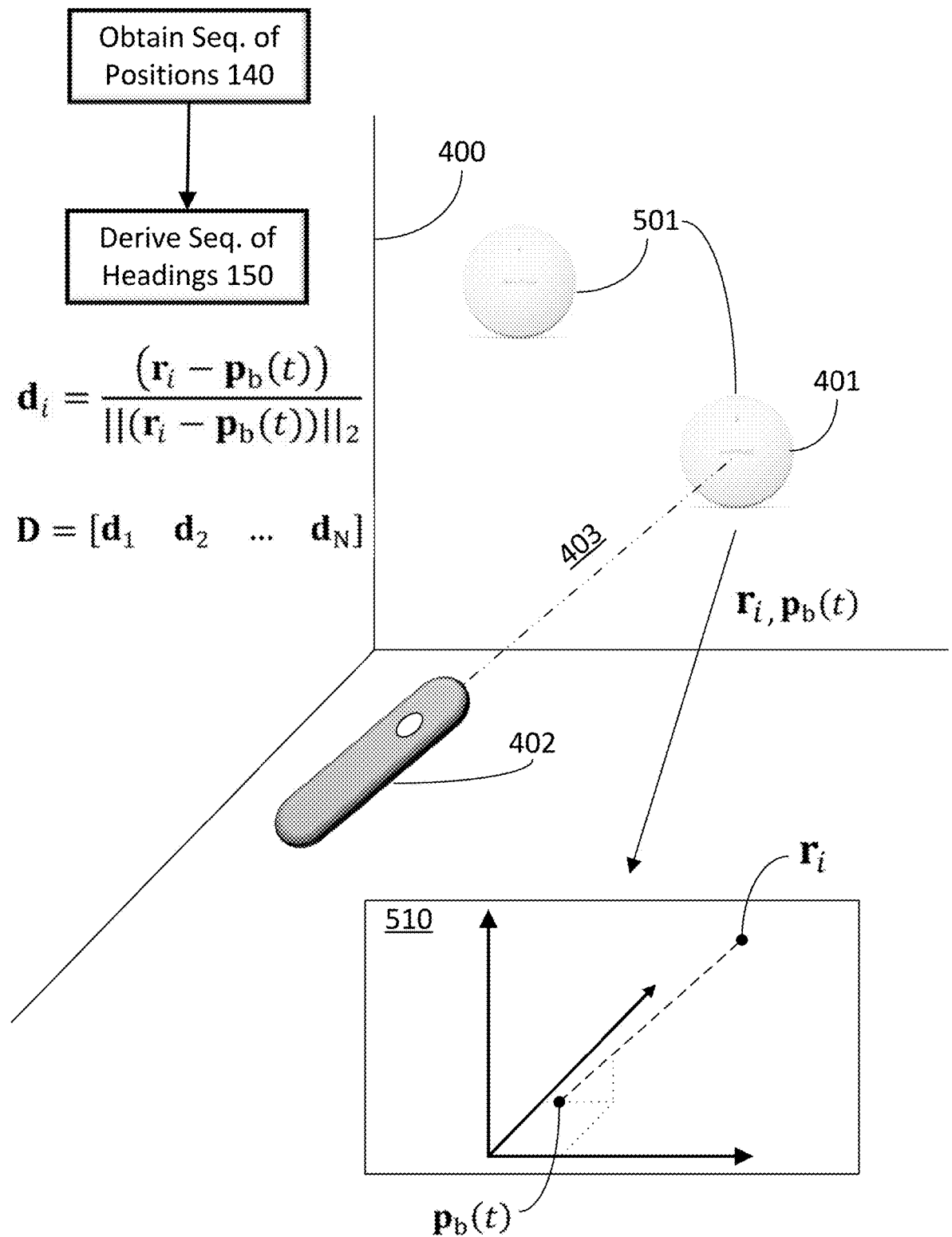
FIG. 5 illustrates a specific embodiment for obtaining a sequence of headings in the first frame of reference in accordance with specific embodiments disclosed with reference to FIG. 1.

FIG. 5 illustrates an approach that can be used in the execution of specific embodiments of steps 140 and 150 in FIG. 1. FIG. 5 includes the same physical frame of reference 400 as in FIG. 4. Additionally, FIG. 5 shows how heading values for the object 402 can be measured and captured in a first frame of reference 510 defined by the set of external positioning devices 501. In embodiments in accordance with FIG. 5, obtaining each heading value in the sequence of heading values of the object in the first frame of reference as in step 150 comprises multiple sub-steps. First, the process requires obtaining a sequence of position values for the external positioning devices $r_i$ in the first frame of reference. The sequence of position values will indicate the position of the external positioning device that will be used as the target of headings such as heading 403. In other words, each entry in the sequence will be the position of the external positioning device that the object should be oriented towards when the measurement is taken. The process further comprises determining a sequence of vectors, in the first frame of reference, from the position values of the object $p_b(t)$ to the position of the currently targeted external positioning device $r_i$. The position values for the object can be the values measured by the external positioning devices each time a confirmation is generated that the object is oriented in accordance with the next element in the orienting sequence. The process further comprises determining a direction of the vectors. This can be conducted using the equation $d_i=(r_i-p_b(t))/\|(r_i-p_b(t))\|_2$. The direction values so calculated will be the heading values in the first frame of reference needed to calculate the transform between the two frames of reference. The measurement of the positions and derivation of the heading value can be repeated multiple times t0 develop a sequence of measurement values in the form of a matrix of headings $D=[d_1\ d_2\ \ldots\ d_N]$ where N is the number of orientations in the orienting sequence. These values can subsequently be used to generate a transform between the two frames of reference as described below.

In accordance with the specific embodiments disclosed in FIGS. 4 and 5, the two sequences of heading values, one in the first frame of reference and one in the second frame of reference, comprise the matrix of directions D obtained by the external positioning device and the matrix of headings H obtained by the onboard sensor on the object. The matrices are constituted as: $D=[d_1\ d_2\ \ldots\ d_N]$ and $H=[h_1\ h_2\ \ldots\ h_N]$, where N is the number of points in the orienting sequence (in this example it is the number of external positioning devices). These sets of headings can be used to derive a transform between the first and second frames of reference. In particular, the sequences of heading values can be used to determine the matrices R and M mentioned above with reference to the transform generated in step 160.

The problem of finding the matrices can be reformulated as finding the matrices $\hat{R}$ and $\hat{M}$, such that for each i, $h_i-\hat{R}\hat{M}d_i$ is as close to $0=[0\ 0\ 0]^T$ as possible. For example, the minimization algorithm may seek to iteratively reduce the Mean Squared Error (MSE) $J(\hat{R},\hat{M})=\Sigma_{i=1}^N\|h_i-\hat{R}\hat{M}d_i\|$. In another approach, an estimate of the optimal matrices $\hat{R}$ and $\hat{M}$ may be calculated by first computing $B=HD^T$ and its Singular Value Decomposition (SVD) $B=USV^T$ with U and V being two orthogonal matrices of dimension N×N and S is a diagonal matrix of dimension N×N. Estimates of the optimal rotation and handedness matrices may then be given by $\hat{M}=\text{diag}(1\ 1\ \det(U)\ \det(V))$ and $\hat{R}=UV^T\hat{M}$, where diag(v) is a matrix with v on its diagonal and zero everywhere else and det(A) is the determinant of matrix A.

Throughout this disclosure a first reference frame was used to refer to a reference frame in which measurements by a set of external positioning devices were captured while a second reference frame was used to refer to a reference frame in which measurements by an onboard sensor were captured. However, the approaches disclosed herein are broadly applicable to any system involving sensors that capture data in non-parallel reference frames. Furthermore, the first reference frame could be an inertial frame of reference defined by the action of a sequence of wireless signal time of flight analyses conducted by the external positioning devices, and the second frame of reference could be a navigation frame of reference centered on the disclosed object.

Throughout this disclosure the example of a remote control was periodically used as an example of a system that can benefit from the approaches disclosed herein. However, the approach is more broadly applicable to a wide variety or objects that must be tracked in physical space in which measurements concerning the object are obtained in different reference frames. The class of approaches towards which the approaches disclosed herein are most beneficial include those in which high precision sensors are not available or are commercially impracticable, and approaches in which the heading of the device cannot be easily derived from the object's motion. Furthermore, approaches in which the device is a pointing device are conducive to some of the embodiments disclosed herein in that the orientation of the object towards an external positioning device or other target is intuitive from a user perspective and does not need to be taught or assisted.

If high precision sensors were available, an alternative approach, in which generating a transform would not be necessary, would be to measure position and orientation of the object in parallel frames. This could involve equipping both the object and the external positioning devices with high precision sensors for detecting the direction of gravitational acceleration and magnetic north. If both sets of sensors were sufficiently aligned and calibrated, such that the frames of reference were parallel, alignment of any measurements taken therefrom would not be necessary. Also, if high precision accelerometers were available, the position of the device could be determined directly from an onboard accelerometer and orientation and position could be determined in the same reference frame. Accelerometer data can be used to derive position data by being rotated to obtain proper acceleration, then, subtracting gravity and integrating two times. However, this approach is unfortunately very noise dependent. Small errors in the accelerometers values or in the current orientation estimates propagates through the double integration and this renders the output position unusable. In the case of consumer electronics, both approaches may not be feasible as sensor precision tends to be positively correlated with sensor cost.

If heading could be derived from position, an alternative approach, in which generating a transform would not be necessary, would be to preprogram the system with the information necessary to derive heading from position. These kinds of approaches are used in vehicle navigation. Since a vehicle tends to move in a forward direction, heading can be derived from tracking the change in position of the vehicle. However, in the case of a handheld device, or any device whose orientation and velocity are disassociated, these kinds of short cuts are not available.

Many of the approaches disclosed herein are beneficially applied to systems with a first sub-system that can only measure position, and a second sub-system that can only measure orientation. However, it is more broadly applicable in that the transform can provide a double check on orientation information obtained by that first sub-system and/or position information obtained by that second sub-system. Furthermore, it is more broadly applicable to systems in which either sub-system can make both measurements, but only sporadically or with a level of accuracy and precision that is periodically insufficient or unreliable.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, the disclosure used the example of a set of external positioning devices and an onboard sensor as two sets of sensors for tracking an object. However, specific embodiments disclosed herein are more broadly applicable such as to a system with two sets of external sensors whose measurements are taken in different non-parallel frames of reference. As another example, different sets of external sensors could measure both orientation and position, in different reference frames, such that the invention is applicable without an onboard sensor on the device being tracked. These and other modifications and variations to the present invention may be practiced by those skilled in the art, without departing from the scope of the present invention, which is more particularly set forth in the appended claims.

What is claimed is:

1. A process comprising:
providing instructions to orient an object towards a set of points in an orienting sequence, wherein the set of points have positions that are known by a positioning system, and wherein the positioning system comprises one or more external positioning devices;
obtaining, in accordance with the orienting sequence and using an onboard sensor, a sequence of heading values of the object in a second frame of reference;
obtaining, in accordance with the orienting sequence and using the one or more external positioning devices, a sequence of position values of the object in a first frame of reference;
deriving, using the sequence of position values of the object in the first frame of reference, a sequence of heading values of the object in the first frame of reference; and
generating a transform between the first and second frames of reference using the sequence of heading values of the object in the first frame of reference and the sequence of heading values of the object in the second frame of reference;
wherein deriving the sequence of heading values of the object in the first frame of reference:
(i) comprises obtaining, in accordance with the orienting sequence and using the one or more external positioning devices, a sequence of position values for the external positioning devices in the first frame of reference; and
(ii) uses the sequence of position values for the object in the first frame of reference and the sequence of position values for the external positioning devices in the first frame of reference.

2. The process of claim 1, wherein:
the set of points includes one or more of the external positioning devices.

3. The process of claim 2, further comprising:
tracking the object using position data from the one or more external positioning devices, orientation data from the onboard sensor, and the transform.

4. The process of claim 2, wherein providing instructions to orient the object towards the one or more external positioning devices in the sequence comprises:
generating, in accordance with the orienting sequence, a sequence of human-perceptible signals;
receiving, in accordance with the orienting sequence, a sequence of confirmations; and
wherein the generating of the sequence of human-perceptible signals is gated by the receiving of the sequence of confirmations.

5. The process of claim 4, wherein:
the generating of the sequence of human-perceptible signals is conducted electronically on the one or more external positioning devices;
the human-perceptible signals in the sequence of human-perceptible signals are one of: auditory signals and visual signals; and
the confirmations in the sequence of confirmations are generated on the object in response to a user-input received by the object.

6. The process of claim 4, wherein:
each confirmation in the sequence of confirmations is generated on the object automatically in response to the onboard sensor detecting that the object has been moved and then held still.

7. The process of claim 2, wherein providing instructions to orient the object towards the one or more external positioning devices comprises:
displaying a different symbol from a set of symbols on an exterior surface of each external positioning device in the one or more external positioning devices; and
wherein the set of symbols indicate the orienting sequence.

8. The process of claim 2, wherein:
the first frame of reference is an inertial frame of reference;
the one or more external positioning devices obtains the sequence of position values of the object in the first frame of reference using a sequence of wireless signal time of flight analyses;
the second frame of reference is a navigation frame of reference; and
the onboard sensor on the object obtains the sequence of heading values of the object in the second frame of reference using at least one of: (i) a magnetometer to measure magnetic north; and (ii) a gyroscope to measure a direction of gravitational force.

9. The process of claim 2, wherein obtaining each heading value in the sequence of heading values of the object in the second frame of reference comprises:
measuring a physical orientation vector for the object using the onboard sensor; and
intuiting a heading for the object using the physical orientation vector and preprogrammed knowledge of the object.

10. The process of claim 2, wherein:
the one or more external positioning devices each include wireless transmitters for communicating with other external positioning devices and the object;
the object is a remote control; and
the heading values of the object are pointing directions of the remote control.

11. A system comprising:
an object;
an onboard sensor on the object;
a positioning system having one or more external positioning devices;
a set of points having positions that are known by the positioning system;
wherein the one or more external positioning devices are configured to provide instructions to orient the object towards the set of points in an orienting sequence; and
one or more computer readable media storing instructions to:
obtain, in accordance with the orienting sequence and using the one or more external positioning devices, a sequence of position values of the object in a first frame of reference;
obtain, in accordance with the orienting sequence and using the onboard sensor, a sequence of heading values of the object in a second frame of reference;
derive, using the sequence of position values of the object in the first frame of reference, a sequence of heading values of the object in the first frame of reference; and
generate a transform between the first and second frames of reference using the sequence of heading values of the object in the first frame of reference and the sequence of heading values in the second frame of reference;
wherein deriving the sequence of heading values of the object in the first frame of reference:

(i) comprises obtaining, in accordance with the orienting sequence and using the one or more external positioning devices, a sequence of position values for the external positioning devices in the first frame of reference; and
(ii) uses the sequence of position values for the object in the first frame of reference and the sequence of position values for the external positioning devices in the first frame of reference.

12. The system of claim 11, wherein:
the set of points includes one or more of the external positioning devices.

13. The system from claim 12, wherein the one or more computer readable media further stores instructions to:
track the object using position data from the one or more external positioning devices, orientation data from the onboard sensor, and the transform.

14. The system from claim 12, wherein the one or more external positioning devices are configured to provide instructions to orient the object towards the one or more external positioning devices in the sequence by being configured to:
generate, in accordance with the orienting sequence, a sequence of human-perceptible signals;
receive, in accordance with the orienting sequence, a sequence of confirmations; and
wherein the generating of the sequence of human-perceptible signals is gated by the receiving of the sequence of confirmations.

15. The system of claim 14, wherein:
the generating of the sequence of human-perceptible signals is conducted electronically on the one or more external positioning devices;
the human-perceptible signals in the sequence of human-perceptible signals are one of: auditory signals and visual signals; and
the confirmations in the sequence of confirmations are generated on the object in response to a user-input received by the object.

16. The system of claim 14, wherein:
each confirmation in the sequence of confirmations is generated on the object automatically in response to the onboard sensor detecting that the object has been moved and then held still.

17. The system of claim 12, wherein the one or more external positioning devices are configured to provide instructions to orient the object towards the one or more external positioning devices in the sequence by:
displaying a different symbol from a set of symbols on an exterior surface of each of the one or more external positioning devices; and
wherein the set of symbols indicate the orienting sequence.

18. The system of claim 12, wherein:
the first frame of reference is an inertial frame of reference;
the one or more external positioning devices obtains the sequence of position values of the object in the first frame of reference using a sequence of wireless signal time of flight analyses;
the second frame of reference is a navigation frame of reference; and
the onboard sensor on the object obtains the sequence of heading values of the object in the second frame of reference using at least one of: (i) a magnetometer to measure magnetic north; and (ii) a gyroscope to measure a direction of gravitational force.

19. The system of claim 12, wherein obtaining each heading value in the sequence of heading values of the object in the second frame of reference comprises:
  measuring a physical orientation vector for the object using the onboard sensor; and
  intuiting a heading for the object using the physical orientation vector and preprogrammed knowledge of the object.

20. The system of claim 12, further comprising:
  one or more wireless transmitters, with a one-to-one correspondence with the one or more external positioning devices, wherein the wireless transmitters are configured to allow the external positioning devices to communicate with other external positioning devices and the object;
  wherein the object is a remote control; and
  wherein the heading values of the object are pointing directions of the remote control.

21. A process comprising:
  obtaining, while an object is physically oriented towards a first positioning device:
    (i) a first position of an object in a first frame of reference using the first positioning device and a second positioning device; and
    (ii) a first heading of the object in a second frame of reference using a sensor on the object;
    obtaining, while the object is physically oriented towards the second positioning device:
    (i) a second position of the object in the first frame of reference using the first positioning device and the second positioning device; and
    (ii) a second heading of the object in the second frame of reference using the sensor on the object;
  deriving:
    (i) a third heading in the first frame of reference using the first position of the object in the first frame of reference; and
    (ii) a fourth heading in the first frame of reference using the second position of the object in the first frame of reference; and
  generating a transform from the first frame of reference to the second frame of reference using the first, second, third, and fourth heading.

22. The process of claim 21, further comprising:
  tracking the object using position data from the first and second positioning devices, orientation data from the sensor, and the transform.

23. The process of claim 21, further comprising:
  providing instructions to orient the object towards the first and second positioning devices in an orienting sequence.

24. The process of claim 23, wherein providing instructions to orient the object towards the first and second positioning devices in the orienting sequence comprises:
  generating, in accordance with the orienting sequence, a sequence of human-perceptible signals;
  receiving, in accordance with the orienting sequence, a sequence of confirmations; and
  wherein the generating of the sequence of human-perceptible signals is gated by the receiving of the sequence of confirmations.

25. A process comprising:
  providing instructions to orient an object towards a set of points in an orienting sequence, wherein the set of points have positions that are known by a positioning system, and wherein the positioning system comprises one or more external positioning devices;
  obtaining, in accordance with the orienting sequence and using an onboard sensor, a sequence of heading values of the object in a second frame of reference;
  obtaining, in accordance with the orienting sequence and using the one or more external positioning devices, a sequence of position values of the object in a first frame of reference;
  deriving, using the sequence of position values of the object in the first frame of reference, a sequence of heading values of the object in the first frame of reference; and
  generating a transform between the first and second frames of reference using the sequence of heading values of the object in the first frame of reference and the sequence of heading values of the object in the second frame of reference;
  wherein:
  the set of points includes one or more of the external positioning devices; and
  providing instructions to orient the object towards the one or more external positioning devices in the sequence comprises:
  generating, in accordance with the orienting sequence, a sequence of human-perceptible signals; and
  receiving, in accordance with the orienting sequence, a sequence of confirmations;
  wherein the generating of the sequence of human-perceptible signals is gated by the receiving of the sequence of confirmations.

26. The process of claim 25, wherein deriving the sequence of heading values of the object in the first frame of reference comprises:
  obtaining, in accordance with the orienting sequence and using the one or more external positioning devices, a sequence of position values for the external positioning devices in the first frame of reference.

27. The process of claim 26, wherein:
  deriving the sequence of heading values of the object in the first frame of reference uses the sequence of position values for the object in the first frame of reference and the sequence of position values for the external positioning devices in the first frame of reference.

28. A process comprising:
  providing instructions to orient an object towards a set of points in an orienting sequence, wherein the set of points have positions that are known by a positioning system, and wherein the positioning system comprises one or more external positioning devices;
  obtaining, in accordance with the orienting sequence and using an onboard sensor, a sequence of heading values of the object in a second frame of reference;
  obtaining, in accordance with the orienting sequence and using the one or more external positioning devices, a sequence of position values of the object in a first frame of reference;
  deriving, using the sequence of position values of the object in the first frame of reference, a sequence of heading values of the object in the first frame of reference; and
  generating a transform between the first and second frames of reference using the sequence of heading values of the object in the first frame of reference and the sequence of heading values of the object in the second frame of reference;
  wherein:
  the set of points includes one or more of the external positioning devices; and providing instructions to orient the object towards the one or more external positioning devices comprises:
displaying a different symbol from a set of symbols on an exterior surface of each external positioning device in the one or more external positioning devices;
wherein the set of symbols indicate the orienting sequence.

29. A system comprising:
an object;
an onboard sensor on the object;
a positioning system having one or more external positioning devices;
a set of points having positions that are known by the positioning system;
wherein the one or more external positioning devices are configured to provide instructions to orient the object towards the set of points in an orienting sequence; and
one or more computer readable media storing instructions to:
obtain, in accordance with the orienting sequence and using the one or more external positioning devices, a sequence of position values of the object in a first frame of reference;
obtain, in accordance with the orienting sequence and using the onboard sensor, a sequence of heading values of the object in a second frame of reference;
derive, using the sequence of position values of the object in the first frame of reference, a sequence of heading values of the object in the first frame of reference; and
generate a transform between the first and second frames of reference using the sequence of heading values of the object in the first frame of reference and the sequence of heading values in the second frame of reference;
wherein:
the set of points includes one or more of the external positioning devices; and
the one or more external positioning devices are configured to provide instructions to orient the object towards the one or more external positioning devices in the sequence by being configured to:
generate, in accordance with the orienting sequence, a sequence of human-perceptible signals; and
receive, in accordance with the orienting sequence, a sequence of confirmations;
wherein the generating of the sequence of human-perceptible signals is gated by the receiving of the sequence of confirmations.

30. The system of claim 29, wherein deriving the sequence of heading values of the object in the first frame of reference comprises:
obtaining, in accordance with the orienting sequence and using the one or more external positioning devices, a sequence of position values for the external positioning devices in the first frame of reference.

31. The system of claim 30, wherein:
deriving the sequence of heading values of the object in the first frame of reference uses the sequence of position values for the object in the first frame of reference and the sequence of position values for the external positioning devices in the first frame of reference.

32. A system comprising:
an object;
an onboard sensor on the object;
a positioning system having one or more external positioning devices;
a set of points having positions that are known by the positioning system;
wherein the one or more external positioning devices are configured to provide instructions to orient the object towards the set of points in an orienting sequence; and
one or more computer readable media storing instructions to:
obtain, in accordance with the orienting sequence and using the one or more external positioning devices, a sequence of position values of the object in a first frame of reference;
obtain, in accordance with the orienting sequence and using the onboard sensor, a sequence of a heading values of the object in a second frame of reference;
derive, using the sequence of position values of the object in the first frame of reference, a sequence of heading values of the object in the first frame of reference; and
generate a transform between the first and second frames of reference using the sequence of heading values of the object in the first frame of reference and the sequence of heading values in the second frame of reference;
wherein:
the set of points includes one or more of the external positioning devices; and
the one or more external positioning devices are configured to provide instructions to orient the object towards the one or more external positioning devices in the sequence by:
displaying a different symbol from a set of symbols on an exterior surface of each of the one or more external positioning devices; and
wherein the set of symbols indicate the orienting sequence.

* * * * *